April 21, 1936.  E. ZANDER  2,037,871

RESILIENT WAGON WHEEL

Filed June 26, 1933

Inventor:
ERNST ZANDER, DECEASED
By: MARTA ZANDER, Administratrix

Patented Apr. 21, 1936

2,037,871

UNITED STATES PATENT OFFICE 2,037,871

RESILIENT WAGON WHEEL

Ernst Zander, deceased, late of Bornim, Bez. Potsdam, Germany, by Marta Zander, geb. Kloas, administratrix, Bornim, Bez. Potsdam, Germany, assignor to the firm Vereinigte Stahlwerke Aktiengesellschaft, Dusseldorf, Germany Application June 26, 1933, Serial No. 677,737
In Germany May 2, 1932

9 Claims. (Cl. 152—29)

This invention relates to a resilient wagon wheel made of metal and capable of affording considerable protection to roads.

Experiments continued for years on a trial track provided with many different pavings have proved that the usual wooden wagon wheel of highly loaded vehicles is the chief destroyer of modern road surfaces. This is due chiefly to the rigidity of the ordinary wooden wagon wheels which, as other experiments made by applicant show, undergo practically no change in form up to the moment of fracture when subjected to tests on a tensile testing machine.

The employment of pneumatic tires to obtain resilient wheels is expensive and for economic reasons alone is out of the question with respect to the large number of agricultural and industrial vehicles.

The present invention has for its object to provide a wheel possessing a high degree of resiliency and, though made only of metal, attaining approximately the springiness of vehicles fitted with solid rubber tires.

Figure 1:
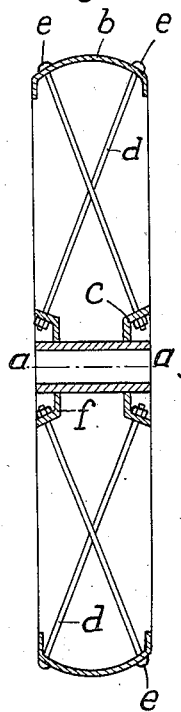
Figure 2:
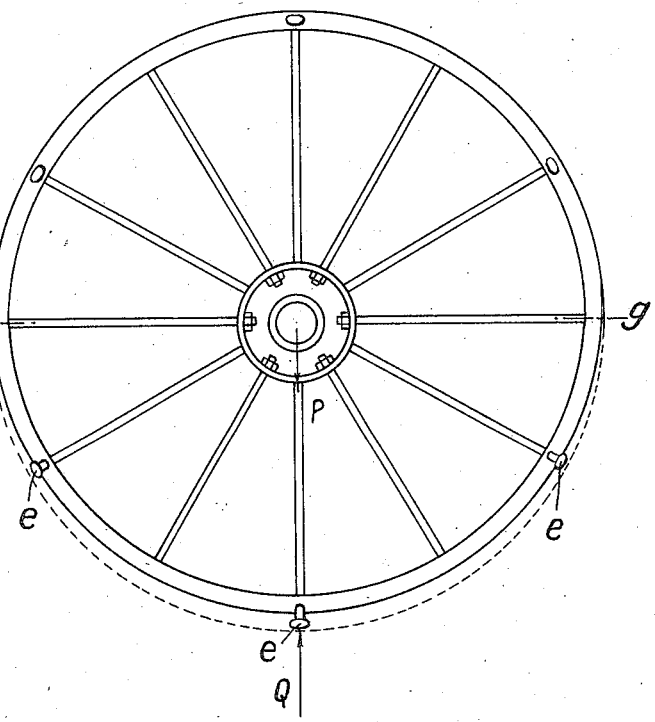
Figure 3:
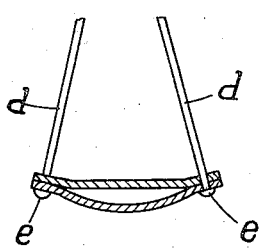

The invention is illustrated in the accompanying drawing, in which Figure 1 is a cross section of a wheel according to the invention; Fig. 2, a side view thereof with diagrammatical indication of the functioning, the lower half of the rim flattened by a load being shown in solid lines and the dotted line indicating the position when not loaded; Fig. 3 is a cross section of a modified form of rim; and Fig. 4, a cross section of still another modified form of rim.

Referring to the drawing, $a$—$a$ designates the center line of the axle of a wheel whose rim is $b$ and whose hub, $c$. The rim is made from an elastic material, such as steel, and the rim and the hub are joined by tension spokes $d$ which by means of a rivet head $e$ or the like pressed from without against the rim and are tightened at the hub by the nuts $f$. The shank of the spoke passes loosely either through the rim at $e$ or through the hub at $f$ or through both. If the axle is then pressed down by a load P according to Fig. 2, the resilient rim will be flattened in its lower half and its form as indicated by the dotted line undergo the change shown by the solid line. Owing to the shortening of the distance between the rim and the hub, the rivet heads will move away from the outside of the rim or the nuts $f$ from their bearing surfaces on the hub. While the upper unloaded part retains its round form, owing to the tensioning effect of the upper spokes $d$, the lower part of the rim acts as arch carrier supported at $g$—$g$ and loaded in the center by the wheel pressure Q.

The carrying capacity of the wheel is in the main increased by forming the cross section of the rim as favorable as possible for the latter's function as arched girder, either according to Fig. 1 or for instance in the manner illustrated in Fig. 3.

Figure 4:
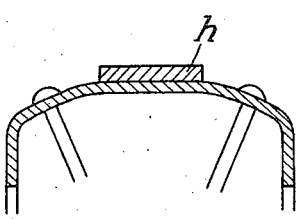

The bent form of the rim section, i. e., of the running face, serves also the purpose of removing the rivet heads $e$ from the road and thus enable them to withdraw from the rim during the deflection of the lower portion thereof without touching the paving. It is further possible of course to provide for displacement of the spokes in their axial direction relative to the rim and hub, or the rim may have a metal tire $h$, as indicated in Fig. 4, which is advisable for driving on hard roads.

Claims:—

1. Resilient wagon wheel, comprising a resilient rim having an outwardly curved cross section and being provided with bores near its sides, a hub and spokes between the rim and hub, the said spokes being movably mounted and passing through said bores so as to project beyond the rim when a load is exerted upon the same.

2. Resilient wagon wheel, comprising a resilient rim having an outwardly curved cross section and being provided with bores near its sides, a hub also provided with bores and spokes between the rim and hub, the said spokes being movably mounted and passing through said bores of the rim and the hub respectively, so as to project beyond the rim, when a load is exerted upon the same.

3. Resilient wagon wheel, comprising a resilient rim having the shape of a hollow body with an outwardly curved portion, said rim being provided with bores near its sides, a hub and spokes between the rim and hub, the said spokes being movably mounted and passing through said bores so as to project beyond the rim when a load is exerted upon the same.

4. Resilient wagon wheel, comprising a resilient rim having the shape of a hollow body with an outwardly curved portion, said rim being provided with bores near its sides, a hub also provided with bores and spokes between the rim and hub, the said spokes being movably mounted and passing through said bores of the rim and the hub respectively, so as to project beyond the rim when a load is exerted upon the same.

5. Resilient wagon wheel, comprising a resilient rim having an outwardly curved cross section and being provided with bores near its sides, a tire attached to the rim, the said tire having a lesser width than the rim so as to leave free the bores thereof and to increase the curvature of the rim, a hub and spokes between the rim and hub, the said spokes being movably mounted and passing through said bores, so as to project beyond the rim when a load is exerted upon the same.

6. Resilient wagon wheel comprising a resilient rim having an outwardly curved cross section and being provided with bores near its sides, a tire attached to the rim, the said tire having a lesser width than the rim so as to leave free the bores thereof and to increase the curvature of the rim, a hub also provided with bores and spokes between the rim and hub, the said spokes being movably mounted and passing through said bores of the rim and the hub respectively, so as to project beyond the rim, when a load is exerted upon the same.

7. Resilient wagon wheel comprising a resilient metallic rim having an outwardly curved cross section and being provided with bores near its sides, a metallic hub also provided with bores and tension spokes between the rim and hub, the said spokes being provided at their one end with a head, while the other end is screw-threaded, the said spokes being displaceably arranged in crosswise relation between the hub and rim with their heads outwardly projecting through the bores of the rim and with their threaded ends in the bores of the hub, and screw-nuts on the threaded ends of the spokes.

8. Resilient wagon wheel comprising a resilient rim having an outwardly curved cross section and being provided with bores near its sides, a hub and spokes between the rim and hub, the said spokes being movably mounted and passing through said bores, so as to project beyond the rim when a load is exerted upon the same, the curvature of the rim being of such a degree so as to prevent the spokes pushed outwardly when a load is exerted upon the rim from thrusting against the paving.

9. Resilient wagon wheel comprising a resilient rim having an outwardly curved cross section and being provided with bores near its sides, a hub also provided with bores and spokes between the rim and hub, the said spokes being movably mounted and passing through said bores of the rim and the hub respectively, so as to project beyond the rim when a load is exerted upon the same, the curvature of the rim being of such a degree so as to prevent the spokes pushed outwardly when a load is exerted upon the rim from thrusting against the paving.

MARTA ZANDER, GEB. KLOAS,
*Administratrix of the Estate of Ernst Zander, Deceased.*